(12) United States Patent
Nakamura et al.

(10) Patent No.: US 10,666,179 B2
(45) Date of Patent: May 26, 2020

(54) CONTROL SYSTEM

(71) Applicant: DENSO CORPORATION, Kariya, Aichi-pref. (JP)

(72) Inventors: Koichi Nakamura, Kariya (JP); Shuji Kuramitsu, Kariya (JP); Atsuko Oka, Kariya (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 0 days.

(21) Appl. No.: 16/083,691

(22) PCT Filed: Feb. 24, 2017

(86) PCT No.: PCT/JP2017/006968
§ 371 (c)(1),
(2) Date: Sep. 10, 2018

(87) PCT Pub. No.: WO2017/159277
PCT Pub. Date: Sep. 21, 2017

(65) Prior Publication Data
US 2019/0081585 A1      Mar. 14, 2019

(30) Foreign Application Priority Data

Mar. 17, 2016   (JP) .................................. 2016-53700

(51) Int. Cl.
*H02P 21/34* (2016.01)
*B62D 5/04* (2006.01)
(Continued)

(52) U.S. Cl.
CPC ............ *H02P 21/34* (2016.02); *B62D 5/0403* (2013.01); *B62D 5/046* (2013.01); *H02P 6/20* (2013.01);
(Continued)

(58) Field of Classification Search
CPC ................ B08B 9/0326; G05D 16/202; G05D 16/2024; G06F 11/3055; Y10T 137/0318
See application file for complete search history.

(56) References Cited

U.S. PATENT DOCUMENTS

2003/0200018 A1   10/2003  Arimura
2010/0032246 A1*   2/2010  Kattainen ................. B66B 1/30
                                                                187/305
(Continued)

FOREIGN PATENT DOCUMENTS

JP      H04-291610 A    10/1992
JP      2003-319678 A   11/2003
(Continued)

*Primary Examiner* — Kawing Chan
*Assistant Examiner* — Zoheb S Imtiaz
(74) *Attorney, Agent, or Firm* — Knobbe, Martens, Olson, & Bear, LLP

(57) ABSTRACT

A control system includes a plurality of control devices each including an initial check unit that performs an initial check before drive control of a rotary electric machine, a transmission/reception unit that transmits/receives an end signal indicating that the initial check is ended, and a drive control unit that performs the drive control of the rotary electric machine after the initial check. The drive control unit starts the drive control of the rotary electric machine when the initial check of the corresponding control device is ended and the end signal is acquired from another control device, and starts the drive control of the rotary electric machine after a lapse of a predetermined time from the start of the initial check of the corresponding control device when the initial check of the corresponding control device is ended and the end signal is not acquired from the another control device.

11 Claims, 13 Drawing Sheets

(51) Int. Cl.
    *H02P 6/20*           (2016.01)
    *H02P 25/22*         (2006.01)
    *H02P 21/22*         (2016.01)
    *H02P 27/06*         (2006.01)

(52) U.S. Cl.
    CPC .............. *H02P 21/22* (2016.02); *H02P 25/22* (2013.01); *H02P 27/06* (2013.01)

(56) References Cited

U.S. PATENT DOCUMENTS

| | | |
|---|---|---|
| 2011/0074333 A1 | 3/2011 | Suzuki |
| 2012/0019181 A1 | 1/2012 | Suzuki |
| 2014/0062375 A1 | 3/2014 | Suzuki |
| 2016/0229444 A1* | 8/2016 | Toda .................... B62D 5/046 |
| 2017/0324352 A1* | 11/2017 | Iwamatsu ............... H02M 7/48 |

FOREIGN PATENT DOCUMENTS

| | | |
|---|---|---|
| JP | 2011-078230 A | 4/2011 |
| JP | 2012-006463 A | 1/2012 |
| JP | 2012-029462 A | 2/2012 |
| JP | 2014-050150 A | 3/2014 |

\* cited by examiner

CONTROL SYSTEM

CROSS REFERENCE TO RELATED APPLICATION

This application is based on Japanese Patent Application No. 2016-53700 filed on Mar. 17, 2016, the disclosure of which is incorporated herein by reference.

TECHNICAL FIELD

The present disclosure relates to a control system for controlling a rotary electric machine.

BACKGROUND ART

Conventionally, a control system for performing the drive control of a rotary electric machine performs an initial check to determine whether or not the rotary electric machine operates normally by conducting current to the winding of the rotary electric machine, before the drive control of the rotary electric machine. Patent Literature 1 describes a control system for performing such an initial check.

The control system described in Patent Literature 1 includes two microcomputers. Upon starting an operation, each microcomputer first performs an initial check, and then waits until the initial check of the other microcomputer is ended. If it is determined that the initial checks by each other's microcomputers are ended, the processing of a main routine is started.

PRIOR ART LITERATURE

Patent Literature

Patent Literature 1: JP H04-291610 A

SUMMARY OF INVENTION

The control system described in Patent Literature 1 is based on the premise that the processing of the initial check is normally ended, and consideration is not given to a case where the processing of the initial check is not normally ended.

It is an object of the present disclosure to provide a control system that can properly start the drive control of a rotary electric machine after an initial check.

According to an aspect of the present disclosure, a control system includes a plurality of control devices each configured to control current conduction to a corresponding winding set of a plurality of winding sets of a rotary electric machine, and to perform signal transmission and reception between the plurality of control devices. Each of the winding sets has windings of a plurality of phases. In the control system, the plurality of control devices each include an initial check unit that performs a predetermined initial check before drive control of the rotary electric machine, a transmission/reception unit that transmits or receives an end signal indicating that the initial check is ended, and a drive control unit that performs the drive control of the rotary electric machine after the initial check is performed. The drive control unit starts the drive control of the rotary electric machine in a case where the initial check of the corresponding control device is ended and the end signal is received from another control device among the plurality of control devices, and starts the drive control of the rotary electric machine after a lapse of a predetermined time from a predetermined time point in the initial check of the corresponding control device in a case where the initial check of the corresponding control device is ended and no end signal is received from the another control device among the plurality of control devices.

In the case where the drive control of the rotary electric machine is started with the end of the initial check of the control device as a trigger, if the initial check of another control device is not ended, there is a possibility that a normal determination cannot be made in the initial check of the other control device. In this respect, in the above configuration, since the drive control of the rotary electric machine is performed on condition that the end signal of the initial check transmitted from another control device is received, it is possible to suppress the situation of starting the drive control of the rotary electric machine before the end of the initial check of another control device.

On the other hand, there is a possibility that the initial check takes a longer time than assumed or the initial check is not ended. In this case, if the end of the initial check of another control device is endlessly awaited, the drive of the rotary electric machine cannot be started. In this respect, in the above configuration, since the drive control of the rotary electric machine is started after a lapse of the predetermined time from a predetermined time point in the initial check of the corresponding control device, it is possible to suppress the situation of endlessly awaiting the end of the initial check of another control device. Therefore, it is possible to suppress the situation of delaying the start of the drive control of the rotary electric machine while suppressing the situation of being unable to make a normal determination in the initial check.

BRIEF DESCRIPTION OF DRAWINGS

The above and other objects, features and advantages of the present disclosure will become more apparent from the following detailed description made with reference to the accompanying drawings, in which.

DESCRIPTION OF EMBODIMENTS

Figure 1:
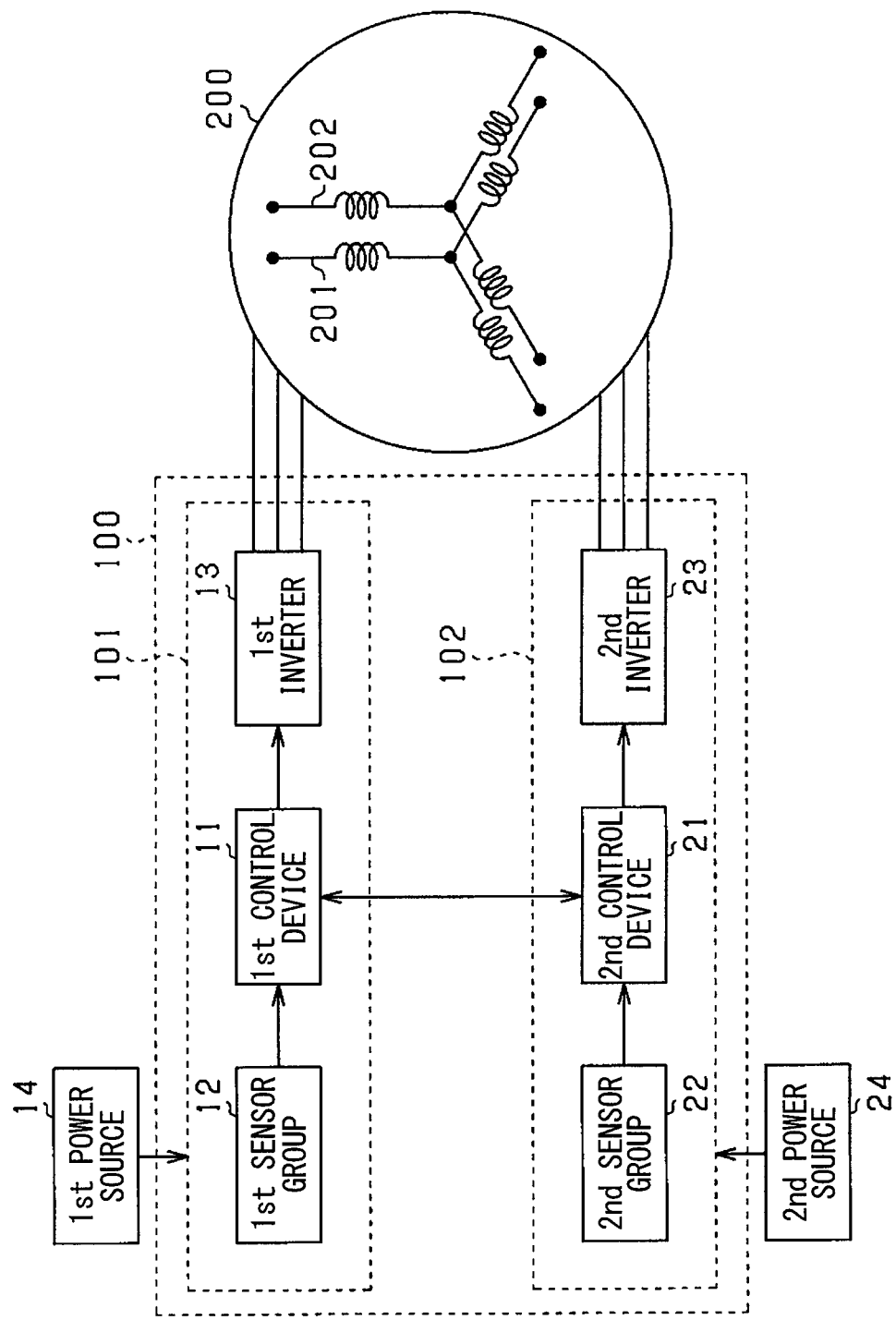
FIG. 1 is a schematic block diagram of a control system according to a first embodiment of the present disclosure.

Hereinafter, embodiments will be described with reference to the accompanying drawings. In the following embodiments, the same or equivalent parts are denoted by the same reference numerals in the drawings, and the description of the parts with the same reference numerals will not be repeated.

First Embodiment

A control system 100 according to the present embodiment is mounted on a vehicle, and used to control a rotary electric machine 200 connected to the steering device of the vehicle so that the steering device functions as an electric power steering. The configuration of the control system 100 according to the present embodiment will be described with reference to FIG. 1.

The control system 100 has a first control system 101 and a second control system 102. The rotary electric machine 200 controlled by the control system 100 has a first winding set 201 and a second winding set 202 each having three-phase windings of U, V, and W phases. The control of current conduction of the first winding set 201 is performed by the first control system 101. The control of current conduction in the second winding set 202 is performed by the second control system 102.

The first control system 101 includes a first control device 11. The first control device 11 is a microcomputer having a CPU, a ROM, a RAM, an I/O, and the like, and realizes various functions when the CPU executes a program installed in the ROM. Detection values detected by sensors included in a first sensor group 12 are inputted to the first control device 11. The sensors included in the first sensor group 12 include, for example, a vehicle speed sensor for detecting a vehicle speed Vdc, a torque sensor for detecting a steering torque Tq inputted to a steering device from a driver of the vehicle, and a rotation angle sensor for detecting a rotation angle θ of the rotary electric machine. The first control device 11 controls a first inverter 13, based on various detection values acquired from the first sensor group 12. The first inverter 13 has a known configuration including a plurality of switching elements, and converts a supplied DC current into three-phase AC currents.

The second control system 102 includes a second control device 21. Like the first control device 11, the second control device 21 is a microcomputer having a CPU, a ROM, a RAM, an I/O, and the like, and realizes various functions when the CPU executes a program installed in the ROM. Detection values detected by sensors included in a second sensor group 22 are inputted to the second control device 21. Since the sensors included in the second sensor group 22 are the same as the sensors included in the first sensor group 12, the description is omitted. The second control device 21 controls a second inverter 23, based on various detection values acquired from the second sensor group 22.

Power is supplied from a first power source 14 to the first control system 101, and power is supplied from a second power source 24 to the second control system 102. The first power source 14 supplies power obtained by stepping down, by a power conversion circuit, power supplied from a high-voltage battery such as a lithium ion battery, and the second power source 24 is a low-voltage battery such as a lead battery. A plurality of sets of high-voltage batteries and power conversion circuits may be provided, and a high-voltage battery for supplying power to the first control system 101 and a high-voltage battery for supplying power to the second control system 102 may be made different from each other. A plurality of low-voltage batteries may be mounted, and a low-voltage battery for supplying power to the first control system 101 and a low-voltage battery for supplying power to the second control system 102 may be made different from each other. Alternatively, power may be supplied from one high-voltage battery through different power conversion circuits to the first control system 101 and the second control system 102. The power supply from the first power source 14 to the first control system 101 and the power supply from the second power source 24 to the second control system 102 are started when the driver of the vehicle turns on the ignition switch of the vehicle.

Figure 2:
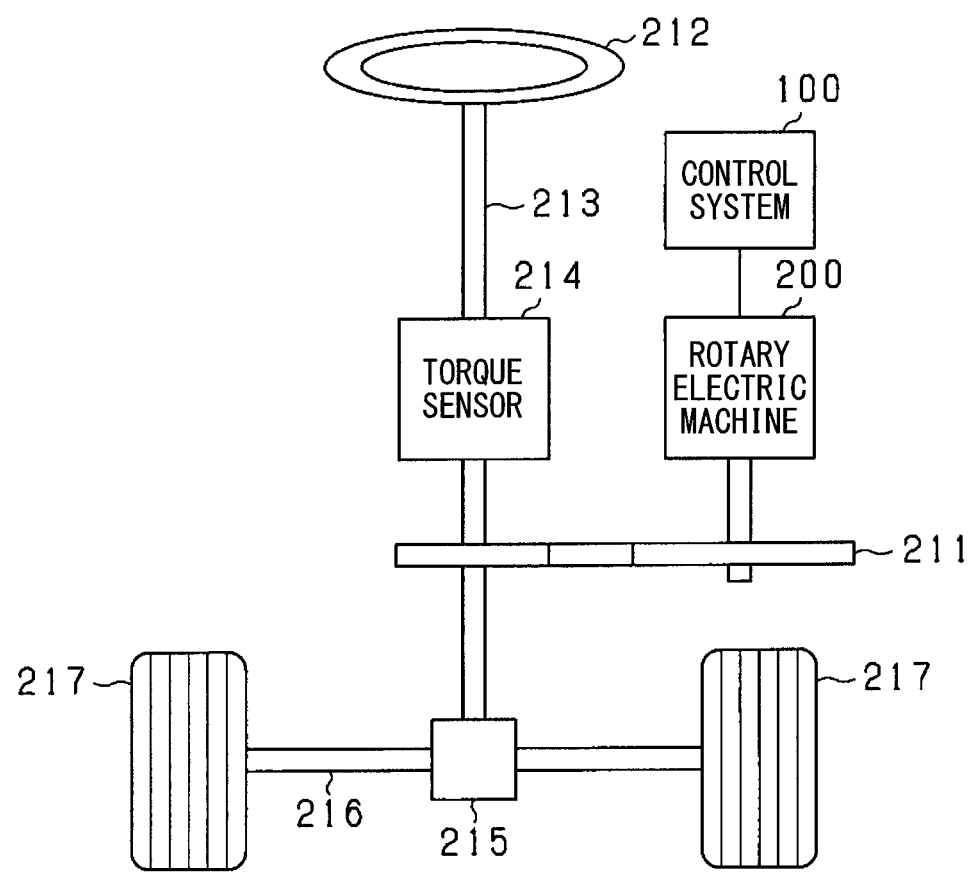
FIG. 2 is a schematic block diagram of an electric power steering system to which the control system and a rotary electric machine are applied.

An electric power steering using the control system 100 according to the present embodiment and the rotary electric machine 200 controlled by the control system 100 as a driving source will be described with reference to FIG. 2. A steering shaft 213 connected to a steering wheel 212 is equipped with a torque sensor 214 for detecting a steering torque Tq. The torque sensor 214 detects the steering torque Tq generated when the driver of the vehicle operates the steering wheel 212, and the detected steering torque Tq is inputted to the first control device 11 and the second control device 21 of the control system 100. Since the first sensor group 12 is included in the first control system 101 and the second sensor group 22 is included in the second control system 102 as shown in FIG. 1, two torque sensors 214 may be provided, the steering torque Tq detected by one torque sensor may be inputted to the first control device 11, and the steering torque Tq detected by the other torque sensor may be inputted to the second control device 21.

A pinion gear 215 is provided at the distal end of the steering shaft 213, and meshes with a rack shaft 216. A pair of wheels 217 are rotatably connected to both ends of the rack shaft 216 through a tie rod or the like. The rotary motion of the steering shaft 213 is converted into the linear motion of the rack shaft 216 by the pinion gear 215, and the pair of wheels 217 are steered in accordance with an angle corresponding to the displacement of the linear motion of the rack shaft 216.

Figure 3:
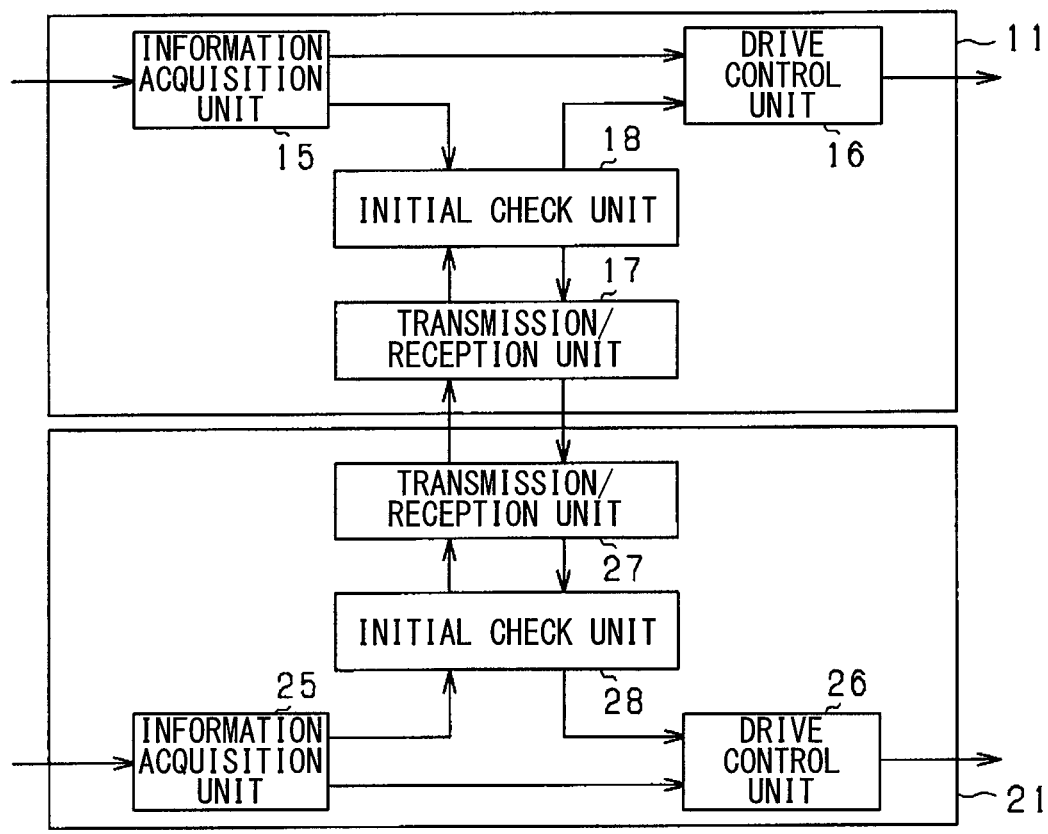
FIG. 3 is a schematic block diagram of a control device included in the control system.

Next, the configuration of the first control device 11 and the second control device 21 included in the control system 100 will be described with reference to FIG. 3. The first control device 11 includes an information acquisition unit 15 for acquiring various detection values from the first sensor group 12 and a drive control unit 16 for controlling the first inverter 13 based on the various detection values acquired by the information acquisition unit 15. Further, the first control device 11 includes a transmission/reception unit 17 for transmitting and receiving various signals to and from the second control device 21. Similarly, the second control device 21 includes an information acquisition unit 25 for acquiring various detection values from the second sensor group 22 and a drive control unit 26 for controlling the second inverter 23 based on the various detection values acquired by the information acquisition unit 25. Further, the second control device 21 includes a transmission/reception unit 27 for transmitting and receiving various signals to and from the first control device 11.

Figure 4:
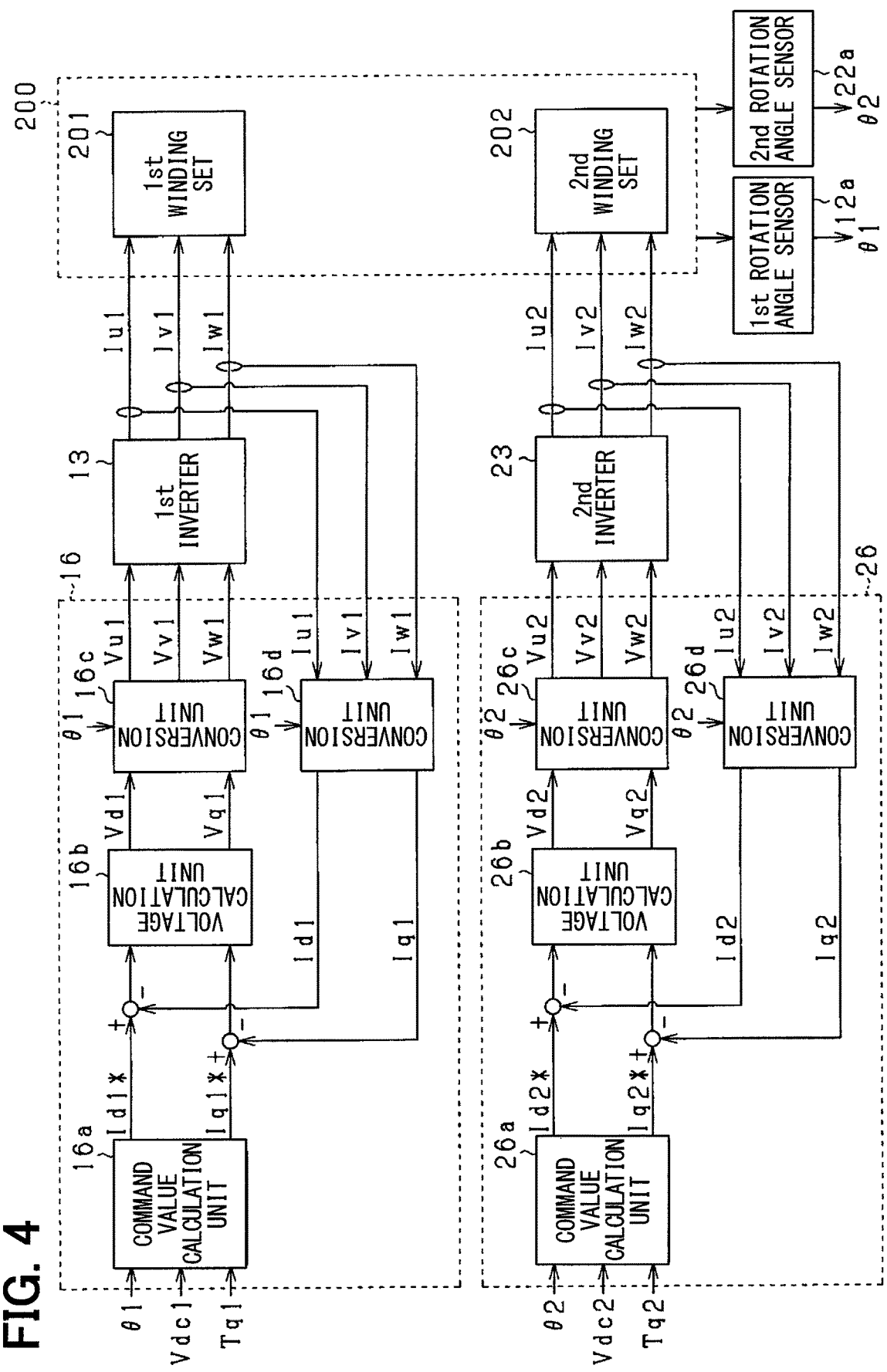
FIG. 4 is a control block diagram showing processing executed by a drive control unit of the control device.

Specific processing executed by the drive control unit 16 included in the first control device 11 and the drive control unit 26 included in the second control device 21 will be described with reference to a control block diagram of FIG. 4.

The rotation angle of the rotary electric machine 200 is detected as a first rotation angle θ1 and a second rotation angle θ2 by a rotation angle sensor 12a included in the first sensor group 12 and a rotation angle sensor 22a included in the second sensor group 22, respectively. The first rotation angle θ1 is inputted to the drive control unit 16 of the first control device 11, and the second rotation angle θ2 is inputted to the drive control unit 26 of the second control device 21.

The steering torque Tq detected by the torque sensor 214 is detected as a first torque Tq1 and a second torque Tq2. In the case where the torque sensor 214 is one sensor, the first torque Tq1 and the second torque Tq2 are the same detection value. In the case where the torque sensor included in the first sensor group 12 and the torque sensor included in the second sensor group 22 are different from each other as described above, the first torque Tq1 and the second torque Tq2 are values detected by the respective sensors. The first torque Tq1 is inputted to the drive control unit 16 of the first control device 11, and the second torque Tq2 is inputted to the drive control unit 26 of the second control device 21.

The vehicle speed Vdc detected by the vehicle speed sensor is detected as a first vehicle speed Vdc1 and a second vehicle speed Vdc2. If the vehicle speed sensor is one sensor, the first vehicle speed Vdc1 and the second vehicle speed Vdc2 are the same detection value. If the vehicle speed sensor included in the first sensor group 12 and the vehicle speed sensor included in the second sensor group 22 are different from each other, the first vehicle speed Vdc1 and the second vehicle speed Vdc2 are values detected by the respective sensors. The first vehicle speed Vdc1 is inputted to the drive control unit 16 of the first control device 11, and the second vehicle speed Vdc2 is inputted to the drive control unit 26 of the second control device 21.

Hereinafter, the current-conduction control of the first winding set 201 by the drive control unit 16 of the first control device 11 will be described. Since the current-conduction control of the second winding set 202 by the drive control unit 26 of the second control device 21 is the same as that executed by the drive control unit 16 of the first control device 11, the specific description is omitted.

The detected first rotation angle 81, first vehicle speed Vdc1, and first torque Tq1 are inputted to a command value calculation unit 16a. The command value calculation unit 16a calculates a d-axis current command value Id1* and a q-axis current command value Iq1*, based on the inputted values. The d-axis current command value Id1* is a current command value of a d-axis current Id1 parallel to the direction of magnetic flux, and the q-axis current command value Iq1* is a current command value of a q-axis current Iq1 orthogonal to the d-axis.

The respective differences between the calculated d-axis current command value Id1* and q-axis current command value Iq1* and the acquired d-axis current Id1 and q-axis current Iq1 are obtained, and inputted to a voltage calculation unit 16b. The acquisition of the detected d-axis current Id1 and q-axis current Iq1 will be described later. The voltage calculation unit 16b calculates a d-axis voltage Vd1 which is a voltage necessary for causing the d-axis current Id1 to be the d-axis current command value Id1* and a q-axis voltage Vq1 which is a voltage necessary for causing the q-axis current Iq1 to be the q-axis current command value Iq1*. The calculated d-axis voltage Vd1 and q-axis voltage Vq1 are inputted to a conversion unit 16c, and the conversion unit 16c converts the d-axis voltage Vd1 and the q-axis voltage Vq1 which are two-phase voltage command values into a U-phase voltage Vu1, a V-phase voltage Vv1, and a W-phase voltage Vw1 which are three-phase voltage command values.

A U-phase current Iu1, a V-phase current Iv1, and a W-phase current Iw1 which are currents supplied from the first inverter 13 to the U-phase, V-phase, and W-phase of the first winding set 201 respectively are detected by current sensors included in the first sensor group 12, and inputted to a conversion unit 16d. The conversion unit 16d converts the U-phase current Iu1, the V-phase current Iv1, and the W-phase current Iw1 which are three-phase current values into the d-axis current Id1 and the q-axis current Iq1 which are two-phase current values.

Referring back to FIG. 3, the first control device 11 includes an initial check unit 18. The initial check unit 18 performs an initial check which is processing for determining whether or not the control of the rotary electric machine 200 is normally performed, before the drive of the rotary electric machine 200. In the initial check, the control amount of the rotary electric machine 200 is generated, the first inverter 13 is controlled, and current conduction to the first winding set 201 is performed. Then, it is determined whether or not the drive of the rotary electric machine 200 is normally performed, using the values of a rotation angle, a current, and the like detected at that time. Since processing executed by an initial check unit 28 included in the second control device 21 is the same processing, the description is omitted.

Figure 5:
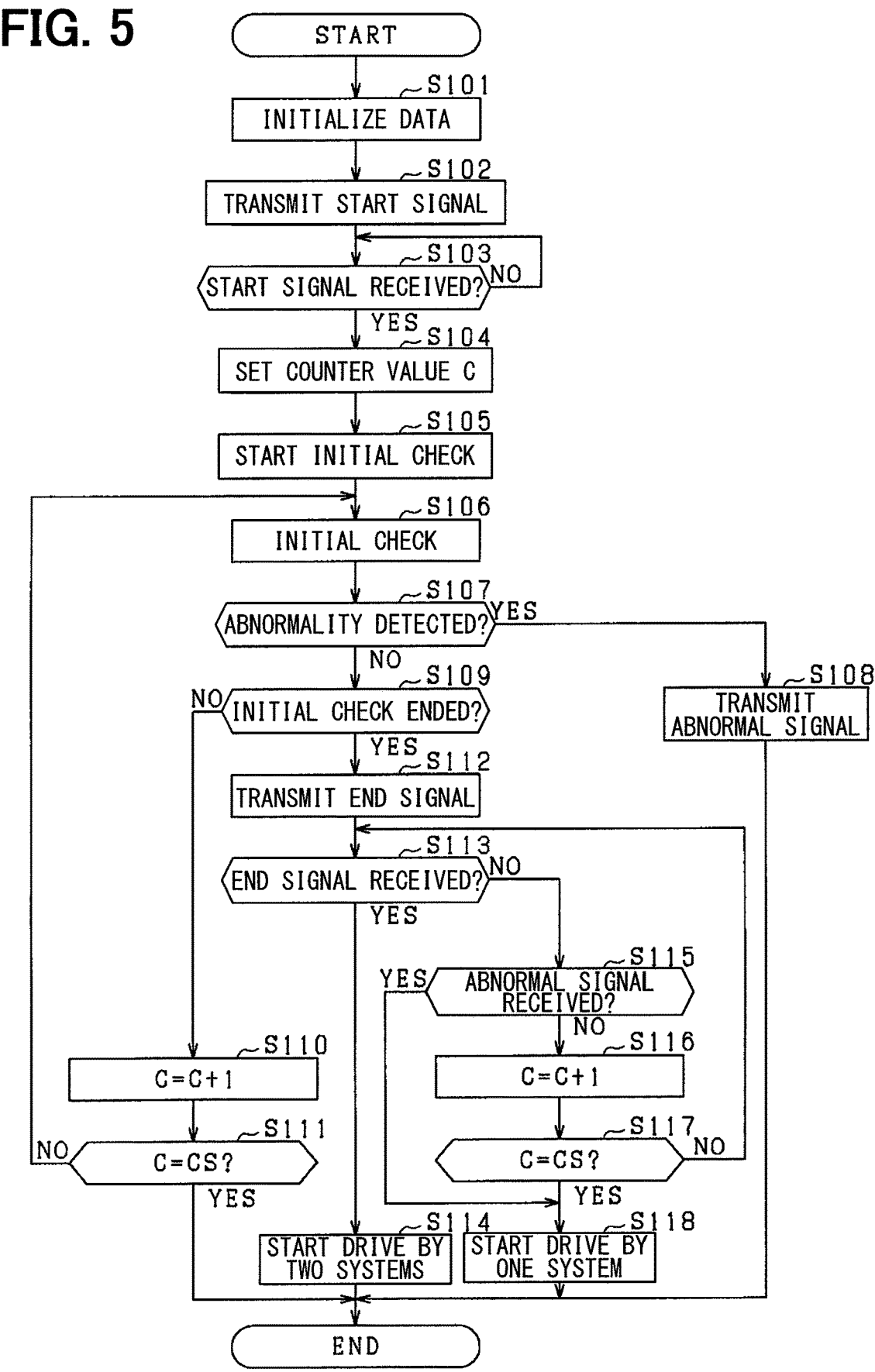
FIG. 5 is a flowchart showing processing executed by an initial check unit of the control device.

Next, the initial check executed by the initial check units 18, 28 will be described with reference to the flowchart of FIG. 5. The processing according to the flowchart of FIG. 5 is processing started in each of the initial check unit 18 of the first control device 11 and the initial check unit 28 of the second control device 21, with the start of the supply of power from the first power source 14 to the first control device 11 and the start of the supply of power from the second power source 24 to the second control device 21 as a trigger.

First, in S101, data is initialized. More specifically, processing such as resetting a memory and setting initial values as various parameters is performed. Then, in S102, a start signal which is a signal for instructing the start of the initial check is transmitted to the other control device, and in S103, waiting is performed until a start signal is received from the other control device. In S103, if the start signal is received before the step S102, positive determination is made. In the case where the control device executing this flowchart is the first control device 11, the other control device is the second control device 21. In the case where the control device executing this flowchart is the second control device 21, the other control device is the first control device 11. The same applies hereinafter.

If positive determination is made in S103, that is, if it is determined that the start signal transmitted from the other control device is received, the flow proceeds to S104, where an initial value of a counter value C is set. The initial value may be 0, or may be 1. Alternatively, the initial value may be any other value.

After S104, the flow proceeds to S105, where the initial check is started. After the initial check is started, the processing of the initial check is performed for a predetermined time in S106. In the initial check in S106, for example, a plurality of predetermined check items are selected one by one to perform the check. Then, in S107, it is determined whether or not abnormality is detected in the processing of the initial check in S106. In S107, if an abnormal value is included in the various detection values acquired from the sensor group or normal current conduction cannot be performed due to the occurrence of a failure in the switching elements included in the inverter, it is determined that abnormality is detected. If positive determination is made in S107, that is, if abnormality is detected in the processing of the initial check in S106, the flow proceeds to S108, where an abnormal signal is transmitted to the other control device, and a series of processing is ended.

If negative determination is made in S107, that is, if abnormality is not detected in the processing of the initial check in S106, the flow proceeds to S109, where it is determined whether or not the initial check is ended. In the step S109, it is determined whether or not the checks of all check items in the initial check are completed. If negative determination is made in S109, that is, if it is determined that the initial check is not completed, an addition to the counter value C is performed in S110, and then in S111, it is determined whether or not the counter value C reaches a time limit CS. If positive determination is made in S111, that is, if the counter value C reaches the time limit CS, drive control is not started in this control device, and a series of processing is ended. If negative determination is made in S111, that is, if the counter value C does not reach the time limit CS, the flow returns to S106, where the initial check is continued.

If positive determination is made in S109, that is, if it is determined that the initial check is ended, an end signal which is a signal indicating that the initial check is ended is transmitted to the other control device in S112, and then in S113, it is determined whether or not an end signal is received from the other control device. In the step S113, not only if the end signal is received at a timing when the initial check is ended, but also if the end signal has already been received, that is, if the other control device has ended the initial check earlier, positive determination is made. If positive determination is made in S113, that is, if the initial check is ended also in the other control device, the flow proceeds to S114. In S114, the drive of the rotary electric machine 200 is started, using both the first control system 101 having the first control device 11 and the second control system 102 having the second control device 21.

On the other hand, if negative determination is made in S113, that is, if the end signal is not received, the flow proceeds to S115, where it is determined whether or not an abnormal signal is received from the other control device. In the step S115, not only if the abnormal signal is received at the timing when the initial check is ended, but also if the abnormal signal has already been received, that is, if the abnormal signal is received from the other control device during the initial check, positive determination is made.

If negative determination is made in S115, that is, if neither the end signal nor the abnormal signal is received, an addition to the counter value C is performed in S116, and then in S117, it is determined whether or not the counter value C reaches the time limit CS. If negative determination is made in S117, that is, if the counter value C does not reach the time limit CS, the step S113 and the subsequent steps are repeated. That is, the reception of the end signal and the abnormal signal is awaited until the counter value C reaches the time limit CS.

If positive determination is made in S117, that is, if the counter value C reaches the time limit CS; in the other control device, positive determination is made in S111, and a series of processing is ended without starting drive control. Therefore, since the drive control of the rotary electric machine 200 is not performed in the system including the other control device, the flow proceeds to S118, where the drive control of the rotary electric machine 200 is started by one system.

If positive determination is made in S115, that is, if the abnormal signal is received from the other control device; in the other control device, positive determination is made in S107, and a series of processing is ended without starting the drive control. Therefore, the flow proceeds to S118, where the drive control of the rotary electric machine 200 is started by one system.

In the case where the drive control of the rotary electric machine 200 is performed by one system in S118, control is performed so that the amount of current conduction of the winding by the inverter of the one system is made larger than in the case of the drive control of the rotary electric machine 200 by two systems so as to generate a sufficient driving force even with one system. In this case, if the amount of current conduction is made twice that in two systems, it is possible to obtain approximately the same driving force as in two systems; however, the amount of current conduction may be smaller than twice the amount of current conduction in two systems.

Next, time charts in the case of executing the processing according to the flowchart of FIG. 5 in the first control device 11 and the second control device 21 will be described with reference to FIGS. 6 to 8.

Figure 6:
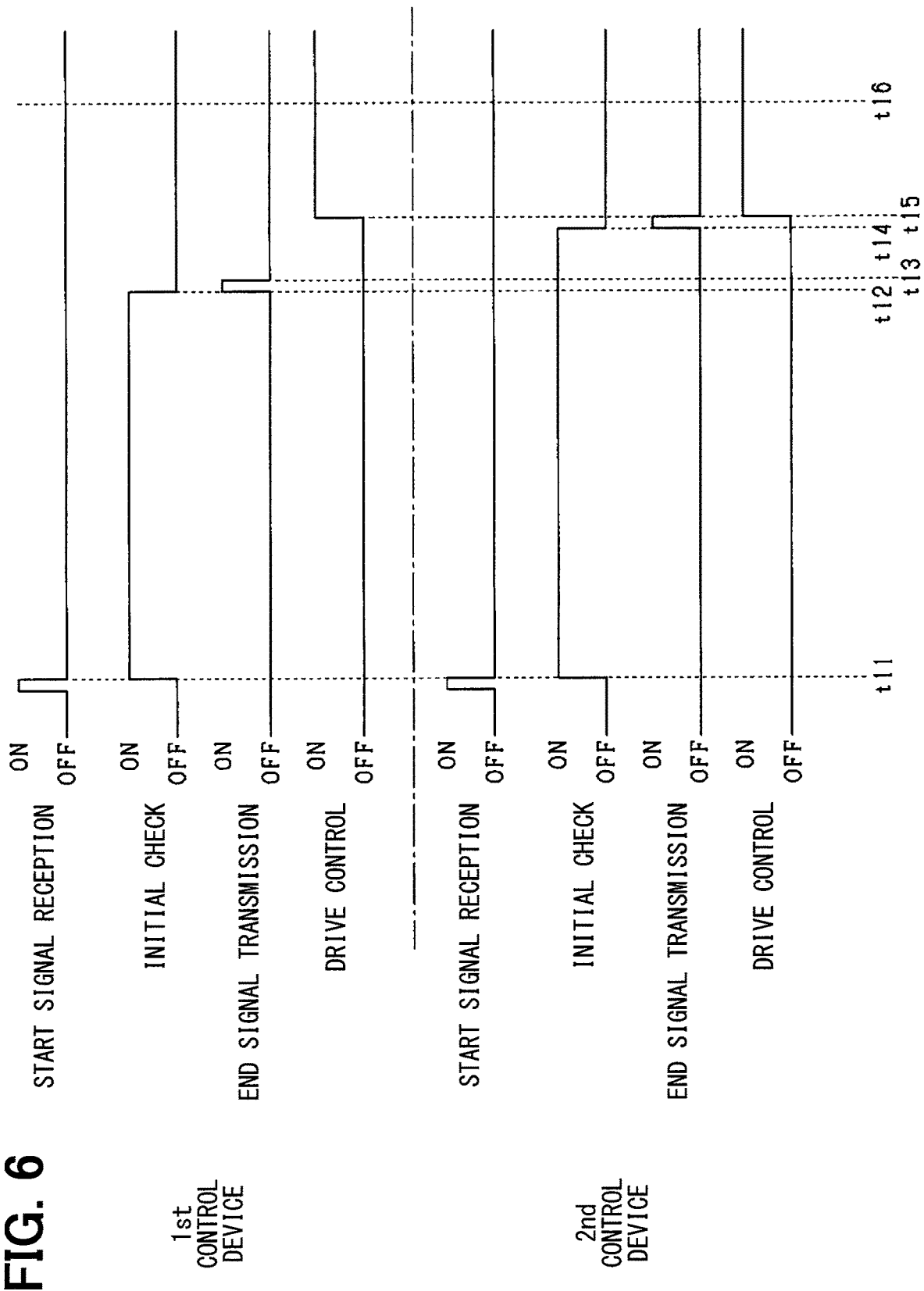
FIG. 6 is a time chart in the case where initial checks are normally ended.

The time chart of FIG. 6 shows a case where both the initial checks by the first control device 11 and the second control device 21 are normally ended within the predetermined time. Since the time chart of FIG. 6 shows an example in which the initial checks are normally ended and the transmission and reception of the abnormal signal is not performed, a time chart related to the transmission and reception of the abnormal signal is omitted.

First, at a time t11, when the start signal is received, both the first control device 11 and the second control device 21 start the initial checks. Then, at a time t12, when the initial check executed by the first control device 11 is ended, the end signal is transmitted from the first control device 11 to the second control device 21. At a time t13 when the second control device 21 receives the end signal, the initial check by the second control device 21 is not ended. Therefore, even after the time t13, the second control device 21 continues the initial check, and the first control device 11 does not start the drive control.

When the second control device 21 ends the initial check at a time t14 after continuing the initial check, the end signal is transmitted from the second control device 21 to the first control device 11. The first control device 11 acquires the end signal at a time t15, and starts the drive control. The second control device 21 starts the drive control at the time t15 when the transmission of the end signal is ended. That is, the first control device 11 and the second control device 21 start the drive control at the same time.

When the end signal is transmitted from one control device to the other control device, a predetermined time might be required before the other control device receives the end signal. In such a case, the start of the drive control by the control device on the transmission side may be delayed by the predetermined time. That is, the time t15 shown in FIG. 6 may be delayed.

In FIG. 6, a time t16 which is a time later than the time t15 when the drive control is started is a time when the counter value C reaches the time limit CS assuming that the addition to the counter value C is continued after the drive control of the rotary electric machine 200.

Figure 7:
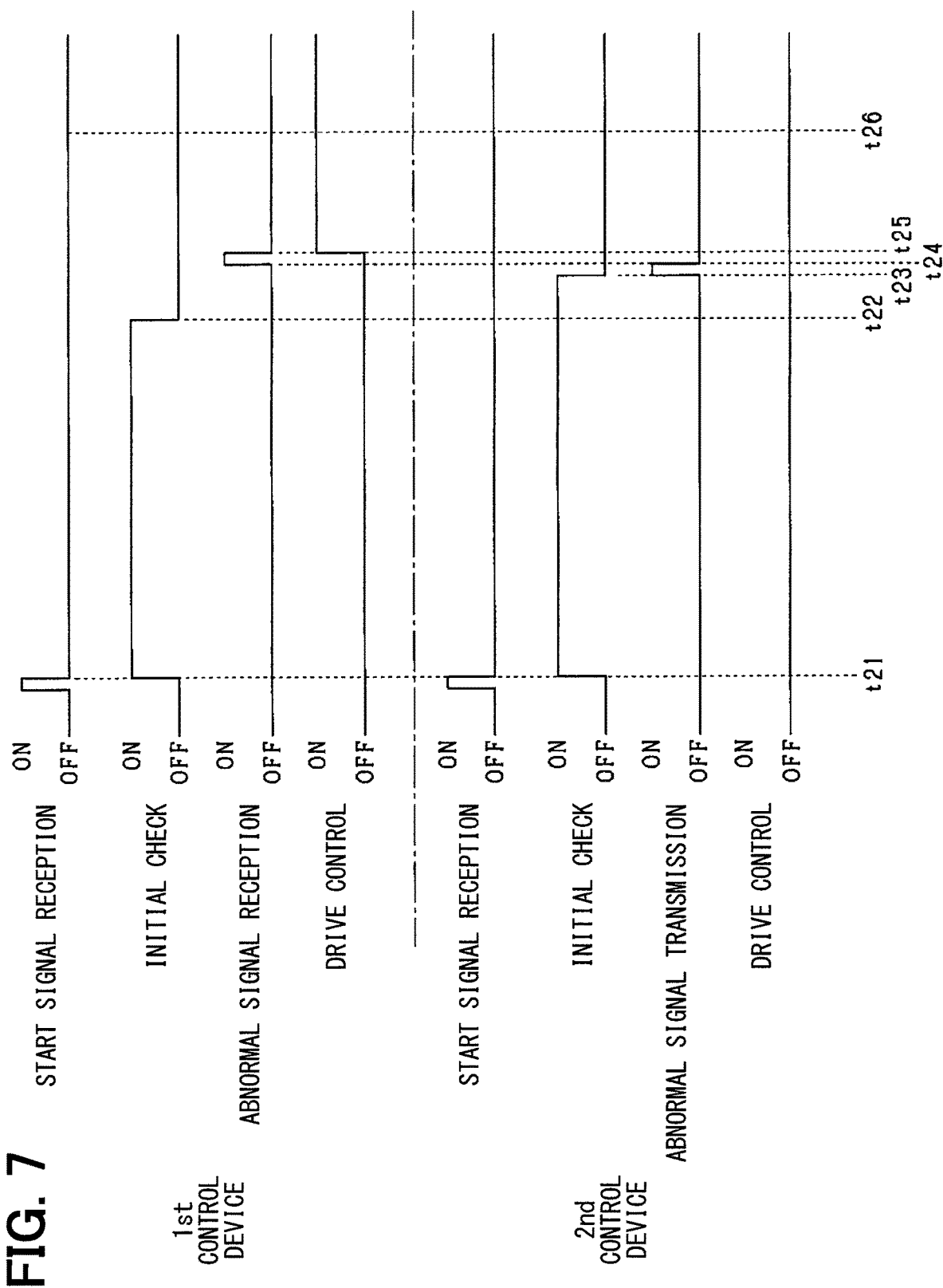
FIG. 7 is a time chart in the case where abnormality is detected in an initial check by one control device.

FIG. 7 shows a case where the initial check by the first control device 11 is normally ended within the predetermined time but abnormality is detected in the initial check by the second control device 21.

First, at a time t21, when the start signal is received, both the first control device 11 and the second control device 21 start the initial checks. Then, at a time t22, when the initial check executed by the first control device 11 is ended, the end signal is transmitted from the first control device 11 to the second control device 21. This end signal is not shown.

When abnormality is detected in the initial check by the second control device 21 at a time t23, the initial check is ended, and the abnormal signal is transmitted from the second control device 21 to the first control device 11. When the first control device 11 receives the abnormal signal at a time t24, the first control device 11 then starts the drive control of the rotary electric machine 200 at a time t25. The time t24 and the time t25 may be the same time.

In FIG. 7, a time t26 which is a time later than the time t25 when the drive control is started is a time when the counter value C reaches the time limit CS assuming that the addition to the counter value C is continued after the drive control of the rotary electric machine 200, as in FIG. 6.

Figure 8:
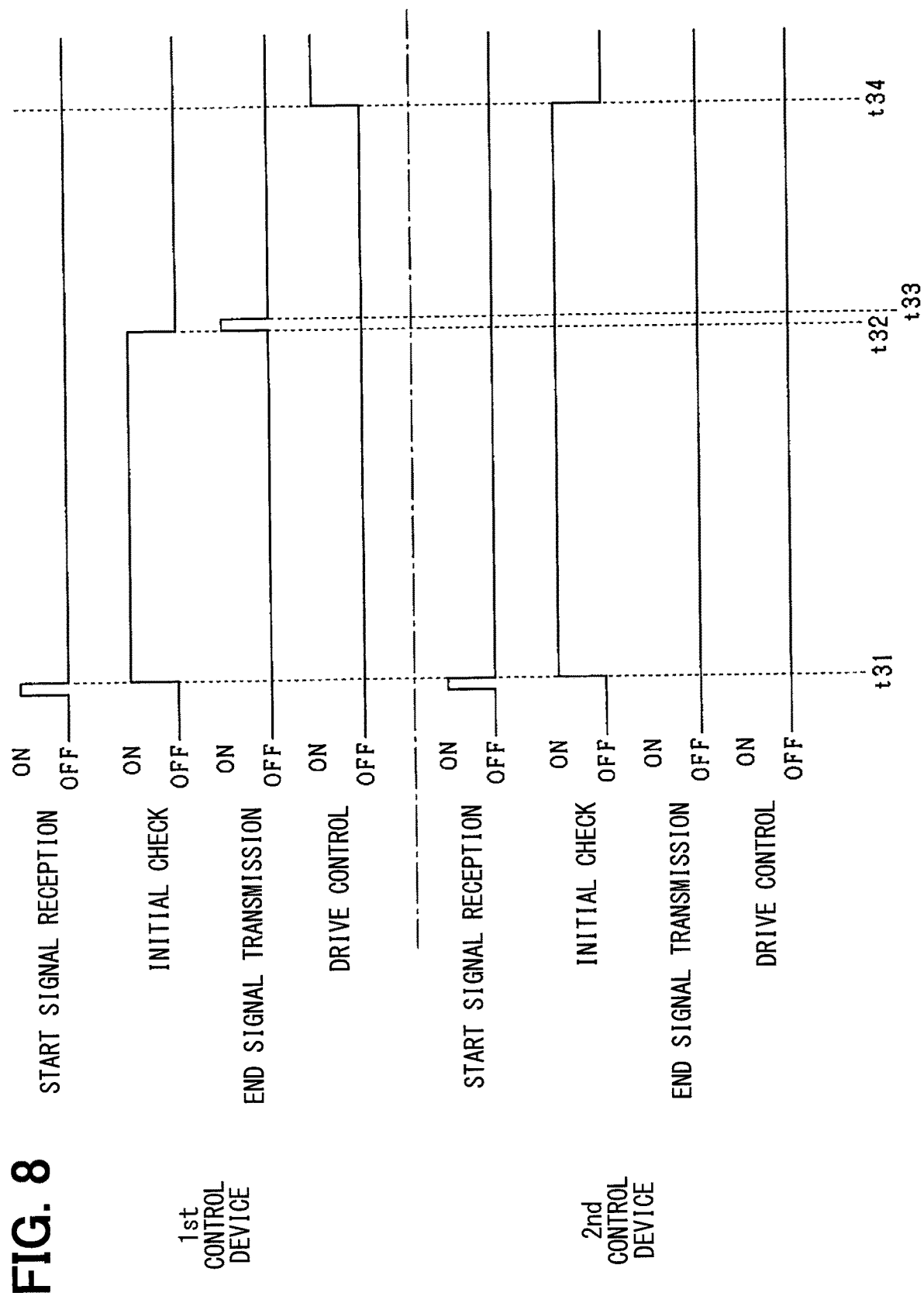
FIG. 8 is a time chart in the case where the initial check by one control device is not ended.

FIG. 8 shows a case where the initial check by the first control device 11 is normally ended within the predetermined time but the initial check by the second control device 21 is not normally ended within the predetermined time though abnormality is not detected.

First, at a time t31, when the start signal is received, both the first control device 11 and the second control device 21 start the initial checks. Then, at a time t32, when the initial check executed by the first control device 11 is ended, the end signal is transmitted from the first control device 11 to the second control device 21. At a time t33 when the second control device 21 receives the end signal, the initial check by the second control device 21 is not ended. Therefore, even after t33, the second control device 21 continues the initial check, and the first control device 11 does not start the drive control.

When the counter value C reaches the time limit CS at a time t34 after the second control device 21 continues the initial check, the second control device 21 ends the initial check, and the first control device 11 starts the drive control of the rotary electric machine 200.

With the above configuration, the control device and the control system according to the present embodiment provide the following advantageous effects.

In the case where the drive control of the rotary electric machine 200 is started with the end of the initial check by the present control device as a trigger, if the initial check by the other control device is not ended, there is a possibility that a normal determination cannot be made in the initial check by the other control device. In this respect, in the above configuration, since the drive control of the rotary electric machine 200 is performed if the end signal from the initial check by the other control device is received, it is possible to suppress the situation of starting the drive control of the rotary electric machine 200 before the end of the initial check by the other control device.

On the other hand, there is a possibility that the initial check takes a longer time than assumed or the initial check is not ended. In this case, if the end of the initial check by the other control device is endlessly awaited, the drive of the rotary electric machine 200 cannot be started. In this respect, in the above configuration, since the drive control of the rotary electric machine 200 is started after a lapse of the predetermined time from the start of the initial check by the present control device, it is possible to suppress the situation of endlessly awaiting the end of the initial check by the other control device. Therefore, it is possible to suppress the situation of delaying the start of the drive control of the rotary electric machine 200 while suppressing the situation of being unable to make a normal determination in the initial check.

The supply of power to the first control system 101 is performed by the first power source 14, and the supply of power to the second control system 102 is performed by the second power source 24. In this configuration, there might be a mismatch between the start timing of the power supply from the first power source 14 to the first control system 101 and the start timing of the power supply from the second power source 24 to the second control system 102 when the vehicle is activated. In the present embodiment, since the initial check is started with the transmission/reception of the start signal as a trigger, even if there is a mismatch between the start timings of the power supply, it is possible to obtain a match between the start timings of the initial checks. It is thereby possible to obtain a match between the time when the time limit CS is reached in the first control system 101 and the time when the time limit CS is reached in the second control system 102.

If there is a mismatch between the start timings of the initial checks; in a stage when the initial check by the present control device is ended, the drive control of the rotary electric machine 200 might be started, even though there is a high possibility that the initial check by the other control device is normally ended. In the present embodiment, since the initial check is started with the reception of the start signal as a trigger, it is possible to obtain an approximate match between the start timings of the initial checks. Therefore, it is also possible to obtain an approximate match between the end timings of the initial checks, which makes it possible to suppress the situation of starting the drive control of the rotary electric machine 200 even though there is a high possibility that the initial check by the other control device is normally ended.

The rotary electric machine 200 includes the first winding set 201 and the second winding set 202, the current-conduction control of the first winding set 201 is performed by the first control system 101, and the current-conduction control of the second winding set 202 is performed by the second control system 102. In addition, the supply of power to the first control system 101 is performed by the first power source 14, and the supply of power to the second control system 102 is performed by the second power source 24. Thereby, even in a situation where the supply of power from one of the first power source 14 and the second power source 24 is not performed, current conduction to the winding set can be performed by the other control system.

In the case where the drive of the rotary electric machine 200 by one control system is started, the driving force of the rotary electric machine 200 is smaller than in the case of current conduction to a plurality of winding sets. In the present embodiment, since in the case where the drive of the rotary electric machine 200 is started in a state where the initial check by the other control device is not ended, the amount of current-conduction of the winding set is made larger than in the case of current conduction by a plurality of winding sets, it is possible to secure the driving force of the rotary electric machine 200 even if the initial check by either control device is not ended.

Second Embodiment

The overall configuration of the control system 100 according to the present embodiment is the same as in the first embodiment, and a condition for starting the initial check is partially different from that in the first embodiment. In the present embodiment, the first control device 11 starts the initial check, with the transmission of the start signal to the second control device 21 as a trigger, and the second control device 21 starts the initial check, with the reception of the start signal from the first control device 11 as a trigger. That is, unlike in the first embodiment, the start signal of the initial check is not transmitted from the second control device 21 to the first control device 11.

In this case, it takes a certain time from when the first control device 11 transmits the start signal to when the second control device 21 receives the start signal and starts the initial check. Accordingly, a given waiting period from the transmission of the start signal to the start of the initial check is provided in the first control device 11. The given period is determined by an experiment conducted beforehand.

Figure 9:
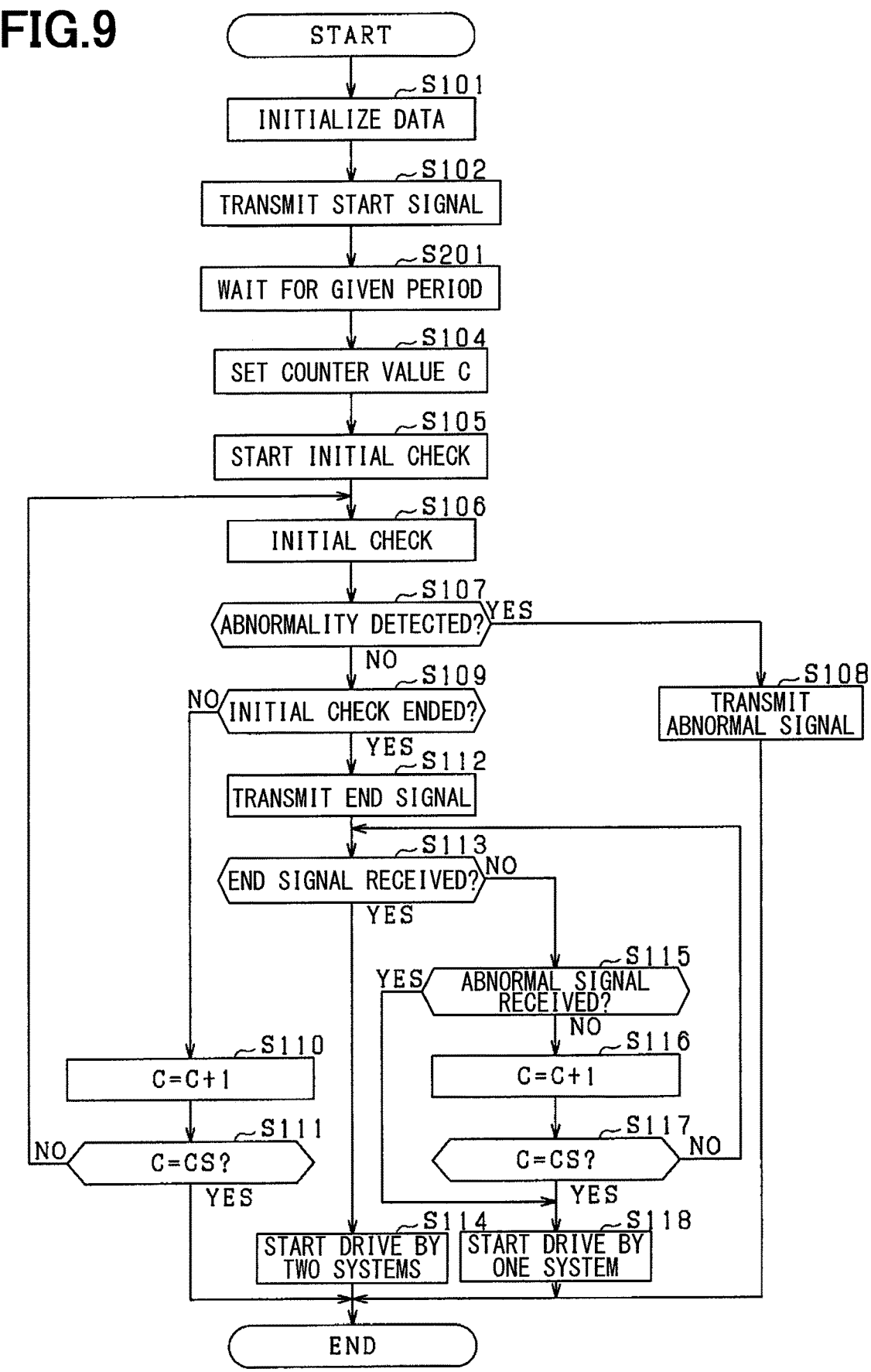
FIG. 9 is a flowchart showing processing executed by the initial check unit of a first control device according to a second embodiment.

Processing executed by the initial check unit 18 of the first control device 11 according to the present embodiment will be described with reference to the flowchart of FIG. 9. The processing according to the flowchart of FIG. 9 is processing started in the initial check unit 18 of the first control device 11, with the start of the supply of power from the first power source 14 to the first control device 11 as a trigger. In FIG. 9, the same steps as in FIG. 5 are denoted by the same reference numerals, and the description is omitted. This also applies to FIG. 10 described later.

First, data is initialized in S101, and then the flow proceeds to S102, where the start signal is transmitted to the second control device 21. After S102, waiting is performed for the given period in S201, and then the step S104 and the subsequent steps are executed. Since the step S104 and the subsequent steps are the same as in the first embodiment, the description is omitted.

Figure 10:
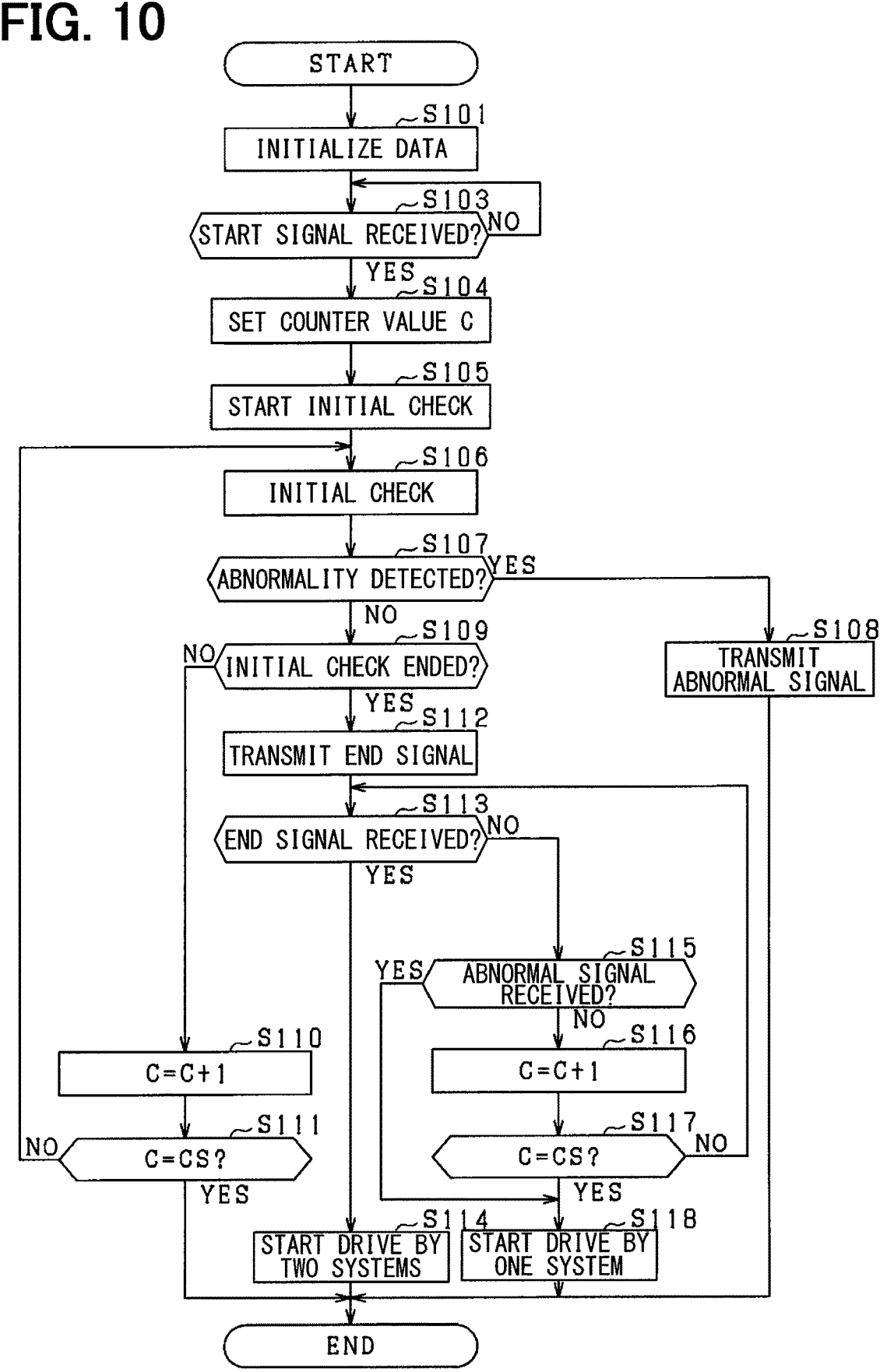
FIG. 10 is a flowchart showing processing executed by the initial check unit of a second control device according to the second embodiment.

Next, processing executed by the initial check unit 28 of the second control device 21 according to the present embodiment will be described with reference to the flowchart of FIG. 10. The processing according to the flowchart of FIG. 10 is processing started in the initial check unit 28 of the second control device 21, with the start of the supply of power from the second power source 24 to the second control device 21 as a trigger.

First, data is initialized in S101, and then the flow proceeds to S103, where waiting is performed until the start signal is received from the first control device 11 in S103. If positive determination is made in S103, that is, if it is determined that the start signal transmitted from the first control device 11 is received, the flow proceeds to S104. Since the step S104 and the subsequent steps are the same as in the first embodiment, the description is omitted.

A series of processing executed by the control system 100 according to the present embodiment will be described with reference to the time chart of FIG. 11.

Figure 11:
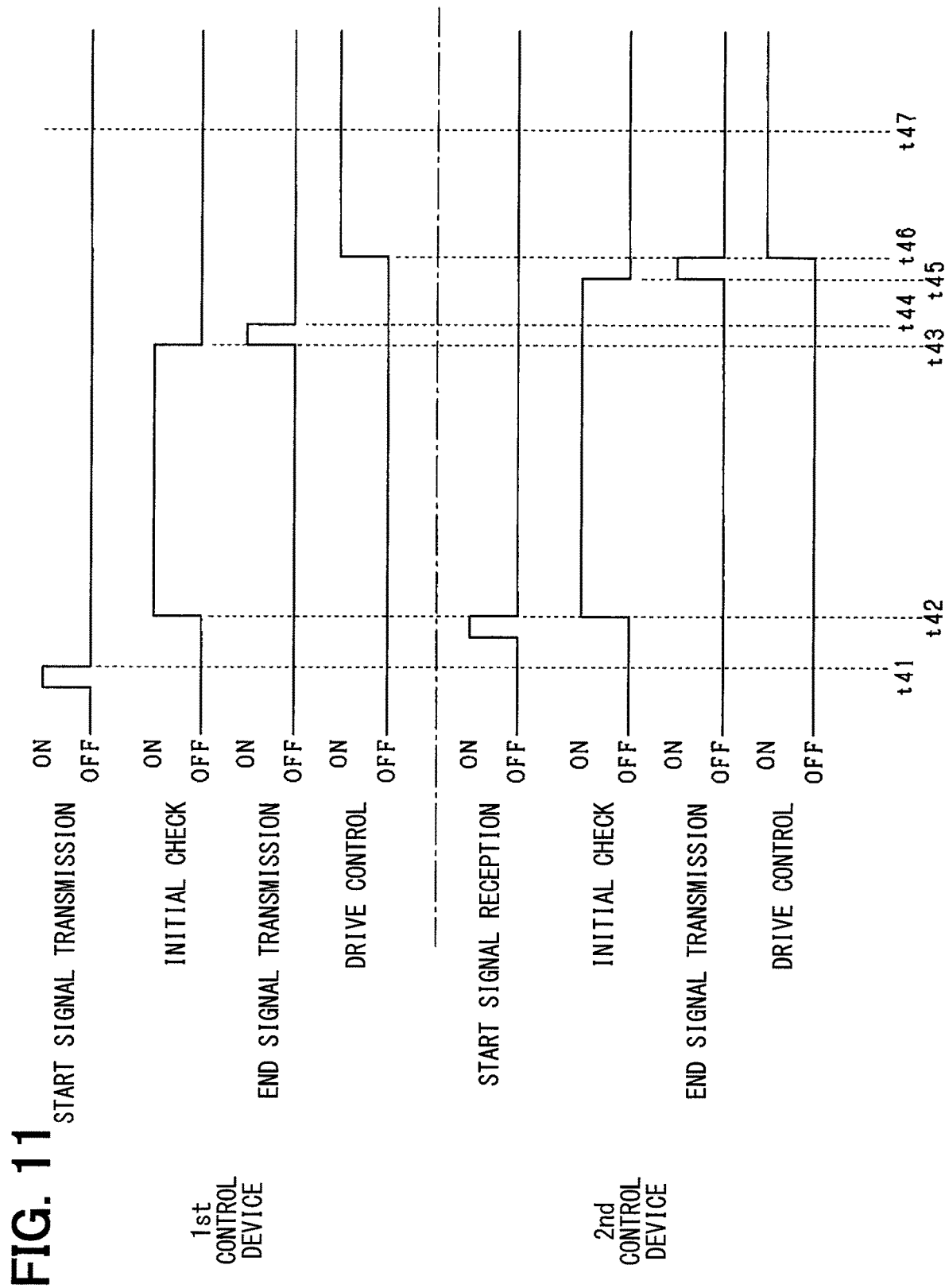
FIG. 11 is a time chart in the case where the processing according to the second embodiment is executed.

The time chart of FIG. 11 shows a case where both the initial checks by the first control device 11 and the second control device 21 are normally ended within the predetermined time. Since the time chart of FIG. 6 shows an example in which the initial checks are normally ended and the transmission/reception of the abnormal signal is not performed, a time chart related to the transmission/reception of the abnormal signal is omitted.

First, after the first control device 11 ends the transmission of the start signal at a time t41, the first control device 11 does not start the initial check and waits until a predetermined waiting time elapses. On the other hand, the second control device 21 completes the reception of the start signal transmitted from the first control device 11 at a time t42, and starts the initial check at the time t42. Therefore, there is obtained an approximate match between the start timing of the initial check executed by the first control device 11 and the start timing of the initial check executed by the second control device 21 at the time t42.

When the initial check executed by the first control device 11 is ended at a time t43, the end signal is transmitted from the first control device 11 to the second control device 21. At a time t44 when the second control device 21 receives the end signal, the initial check by the second control device 21 is not ended. Therefore, even after t44, the second control device 21 continues the initial check, and the first control device 11 does not start the drive control.

When the second control device 21 ends the initial check at a time t45 after continuing the initial check, the end signal is transmitted from the second control device 21 to the first control device 11. The first control device 11 acquires the end signal at a time t46, and starts the drive control. The second control device 21 starts the drive control at the time t46 when the transmission of the end signal is ended. That is, the first control device 11 and the second control device 21 start the drive control at the same time.

In FIG. 11, a time t47 which is a time later than the time t46 when the drive control is started is a time when the counter value C reaches the time limit CS assuming that the addition to the counter value C is continued after the drive control of the rotary electric machine 200. As described above, since the waiting time from the transmission of the start signal to the start of the initial check is provided in the first control device 11, there is obtained an approximate match between the times when the counter value C reaches the time limit CS.

While the start signal is transmitted from the first control device 11 to the second control device 21 in the present embodiment, the start signal may be transmitted from the second control device 21 to the first control device 11. In this case, the second control device 21 starts the initial check after a given waiting period elapses from the transmission of the start signal.

With the above configuration, the control device and the control system according to the present embodiment provide the following advantageous effect in addition to the advantageous effects of the first embodiment.

One control device starts the initial check on the condition of receiving the start signal, and the other control device starts the initial check on the condition of transmitting the start signal. In such a configuration, if the initial check is started with only the transmission/reception as a trigger, there is a mismatch between the start timings of the initial checks, in accordance with the time required from the transmission of the start signal to the reception. In the present embodiment, since the control device that transmits the start signal starts the initial check and the addition to the counter value C after the waiting time elapses from the transmission of the start signal, it is possible to obtain a match between the timings when the counter value C reaches the time limit CS.

Third Embodiment

Figure 12:
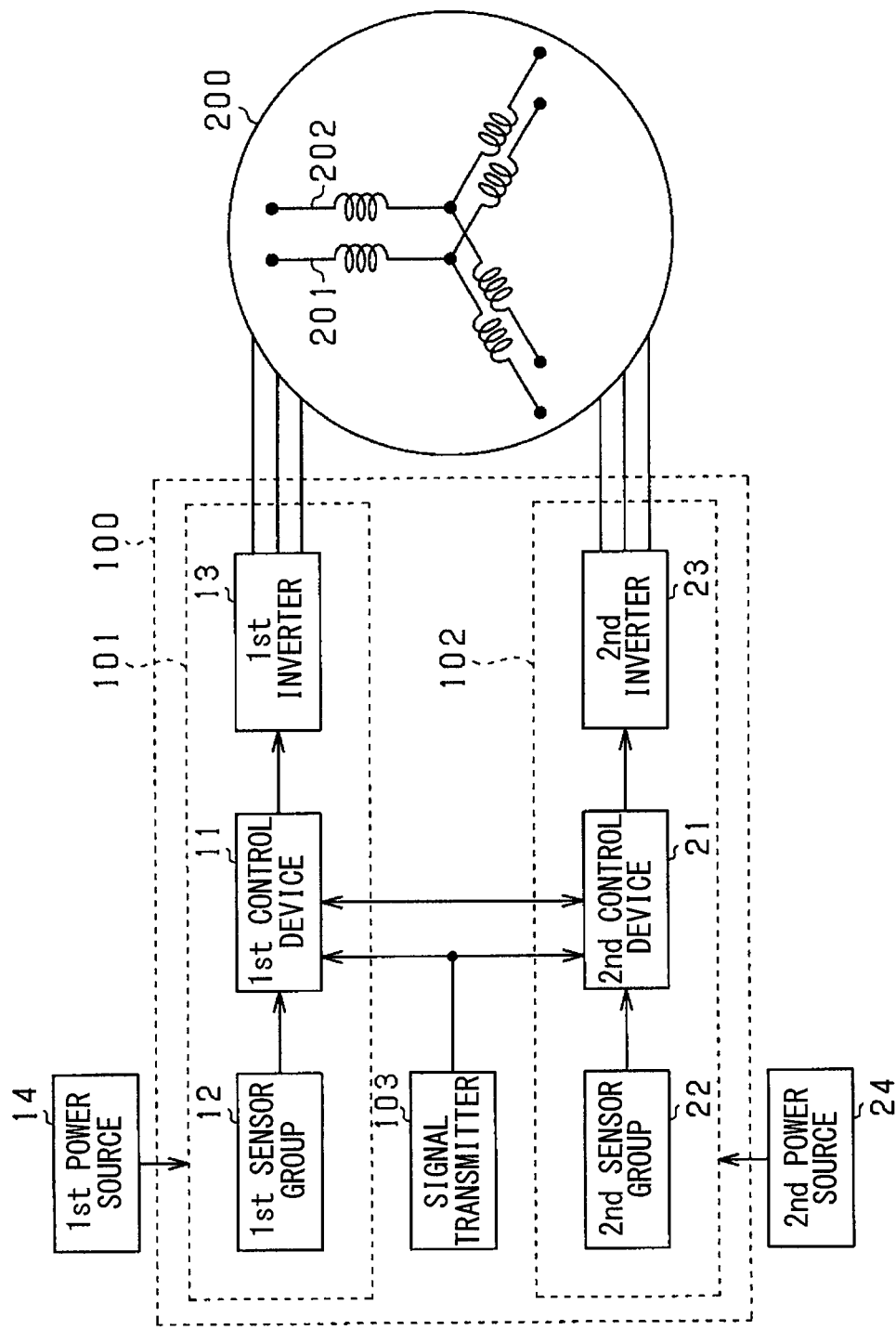
FIG. 12 is a schematic block diagram of a control system according to a third embodiment.

The configuration of a control system 100 according to the present embodiment is partially different from that in the first embodiment. FIG. 12 is an overall block diagram of the control system 100 according to the present embodiment.

The control system 100 includes a signal transmitter 103 in addition to the first control system 101 and the second control system 102. The signal transmitter 103 is a transmission element for transmitting a signal if a predetermined condition is satisfied, and transmits the signal to the first control device 11 and the second control device 21. The signal transmitted by the signal transmitter 103 is a start signal for instructing the start of the initial check. The signal transmitter 103 may be an IC or an LSI.

The condition of transmitting the start signal by the signal transmitter 103 is, for example, to satisfy both a condition that the supply of power from the first power source 14 to the first control system 101 is started and a condition that the supply of power from the second power source 24 to the second control system 102 is started.

The start signal transmitted by the signal transmitter 103 is received by the first control device 11 and the second control device 21. The first control device 11 and the second control device 21 start the initial check, with the reception of the start signal as a trigger. Since a series of processing according to the initial check executed by the first control device 11 and the second control device 21 is the same as the processing executed by the second control device 21 according to the second embodiment shown in FIG. 10, the description is omitted.

With the above configuration, the control device and the control system 100 according to the present embodiment provide the following advantageous effects in addition to the advantageous effects of the first embodiment.

With the configuration in which the start signal is transmitted from the signal transmitter 103 different from the first control device 11 and the second control device 21, it is possible to transmit the start signal to the first control device 11 and the second control device 21 at the same time. It is thereby possible to obtain a match between the start timings of the initial checks.

The start signal is transmitted from the signal transmitter 103, on the condition that the supply of power from the first power source 14 to the first control system 101 is started and the supply of power from the second power source 24 to the second control system 102 is started. Thereby, even if the power supply start is delayed in one control system, it is possible to obtain a match between the start timings of the initial checks.

Fourth Embodiment

Figure 13:
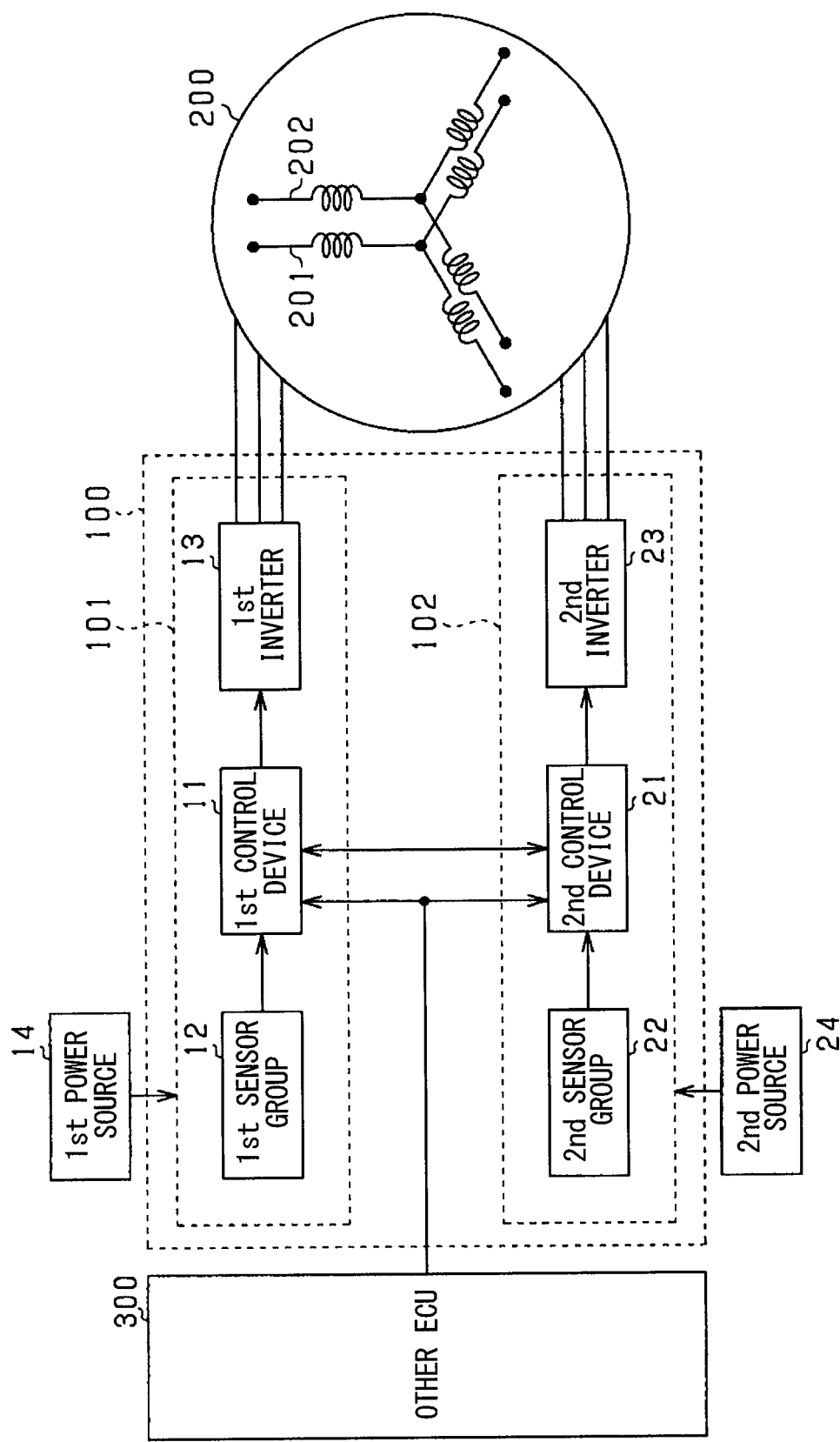
FIG. 13 is a schematic block diagram of a control system according to a fourth embodiment.

The configuration of a control system 100 according to the present embodiment is partially different from that in the first embodiment. FIG. 13 is a block diagram of a system including the control system 100 according to the present embodiment.

The control system 100 is configured so as to be able to receive a signal from another ECU 300 which is another control system. More specifically, the control system 100 and the other ECU 300 are wire-connected to each other via CAN (Controller Area Network), and the control system 100 receives a signal transmitted from the other ECU 300 via the communication line of CAN. The other ECU 300 may be, for example, an ECU for controlling the engine of the vehicle, an ECU for controlling the brake of the vehicle, or any other ECU.

The other ECU 300 transmits the start signal to the first control device 11 and the second control device 21 if a predetermined condition is satisfied. This condition is, for example, to satisfy both a condition that the supply of power from the first power source 14 to the first control system 101 is started and a condition that the supply of power from the second power source 24 to the second control system 102 is started.

Since processing after the start signal is transmitted from the other ECU 300 is the same as in the third embodiment, the description is omitted.

With the above configuration, the control device and the control system 100 according to the present embodiment provide the advantageous effects equivalent to those of the third embodiment.

<Modifications>

In each embodiment, if the initial check is not ended within the time limit CS, the initial check by this control system is ended, and the drive control of the rotary electric machine 200 is not performed. This is because if the drive control of the rotary electric machine 200 is performed in one control system, the initial check by the other control system cannot be normally performed. On the other hand, if the initial check is performed while the vehicle is stopped and a steering operation by the driver is not performed, there is a possibility that the initial check can be normally performed. Therefore, if the initial check is not ended within the time limit CS, the initial check may be continued while performing the drive control of the rotary electric machine 200 by the other control system. Then, when the initial check is ended, switching to the drive control by two systems may be performed. In this case, by gradually increasing the amount of current conduction in the system that has started the drive control while gradually decreasing the amount of current conduction in the system that has been performing the drive control until then, it is possible to perform switching from the control by one system to the control by two systems without a sense of incongruity.

In each embodiment, at least one of the transmission and reception of the start signal is adopted as a trigger to start the initial check. In this respect, the initial check may be started without performing the transmission/reception of the start signal. For example, the initial check by the first control system 101 may be started with the start of the supply of power from the first power source 14 to the first control system 101 as a trigger, and the initial check by the second control system 102 may be started with the start of the supply of power from the second power source 24 to the second control system 102 as a trigger, when the vehicle is activated. In this case, although a mismatch between the start timings of the power supply may be allowed, the mismatch may be anticipated by an experiment or the like to obtain a match between the start timings of the initial checks.

In each embodiment, power is supplied from the first power source 14 to the first control system 101, and power is supplied from the second power source 24 to the second control system 102. In this respect, power may be supplied from one power source to the control system 100, and distributed and supplied to the first control system 101 and the second control system 102. In this case, as the power source, the high-voltage battery adopted as the first power source 14 in each embodiment may be adopted, or the low-voltage battery adopted as the second power source 24 in each embodiment may be adopted. Thereby, due to an approximate match between the start timings of the power supply from the power source to the first control system 101 and the second control system 102, it is possible to obtain an approximate match between the start timings of the initial checks without performing the processing of the transmission/reception of the start signal. Even in this configuration, the transmission/reception of the start signal may be performed as in each embodiment.

In the second embodiment, the given waiting period from the start of the start signal to the start of the initial check is provided in the first control device 11. In this respect, the waiting period may be not provided in the first control device 11, and the addition to the counter value C may be not performed for a given period from the start of the initial check. Alternatively, the waiting period may be not provided in the first control device 11, and the time limit CS in the first control device 11 may be set longer than the time limit CS in the second control device 21. By adopting these means, it is possible to obtain a match between the times when the counter value C becomes the time limit CS. This configuration can also be applied to the above modifications in which the transmission/reception of the start signal is not performed.

In the fourth embodiment, the control system 100 and the other ECU 300 are wire-connected to each other via CAN, but may be wire-connected via another communication standard, or may be wirelessly connected.

In each embodiment, the rotary electric machine 200 having the two winding sets 201, 202 is controlled by the first control system 101 and the second control system 102. In this respect, a rotary electric machine having three or more winding sets may be controlled by three or more control systems. Alternatively, a rotary electric machine having three or more winding sets may be controlled by control systems whose number is smaller than the number of winding sets. In this case, at least one control system controls a plurality of winding sets.

In each embodiment, power is supplied from the first power source 14 to the first control system 101, and power is supplied from the second power source 24 to the second control system 102. In this respect, power may be supplied from a common power source to the first control system 101 and the second control system 102. Alternatively, power may be supplied to the first inverter 13 and the second inverter 23 from a common power source different from the power source of the first control device 11 and the second control device 21.

In each embodiment, the first control device 11 acquires various kinds of detection information from the first sensor group 12, and the second control device 21 acquires various kinds of detection information from the second sensor group 22; however, the first control device 11 and the second control device 21 may acquire various kinds of detection information from one sensor group.

While the embodiments show the control device and the control system for controlling the rotary electric machine used to drive the electric power steering, the control device and the control system are applicable not only thereto but also to other machines. For example, the control device and the control system may be applied to a driving rotary electric machine connected to the driving shaft of the vehicle or a rotary electric machine connected to the engine of the vehicle and used to start up the engine. Further, the rotary electric machine and the control device and the control system for controlling the rotary electric machine can be mounted not only on the vehicle but also on various moving bodies and other various objects.

While the present disclosure has been described with reference to embodiments thereof, it is to be understood that the disclosure is not limited to the embodiments and constructions. The present disclosure is intended to cover various modification and equivalent arrangements. In addition, while the various combinations and configurations, other combinations and configurations, including more, less or only a single element, are also within the spirit and scope of the present disclosure.

The invention claimed is:

1. A control system comprising:
a plurality of control devices each configured to control current conduction to a corresponding winding set of a plurality of winding sets of a rotary electric machine, each winding set having windings of a plurality of phases, and to perform signal transmission and reception between the plurality of control devices, wherein
each of the plurality of control devices includes:
an initial check unit configured to perform a predetermined initial check before drive control of the rotary electric machine;
a transmission/reception unit configured to transmit or receive an end signal indicating that the initial check has ended; and
a drive control unit configured to perform the drive control of the rotary electric machine after the initial check is performed, wherein
the drive control unit is configured
to start the drive control of the rotary electric machine in a case where the initial check of the corresponding control device has is-ended and the end signal is received from another control device among the plurality of control devices, and
to start the drive control of the rotary electric machine after a lapse of a predetermined time from a predetermined time point in the initial check of the corresponding control device in a case where the initial check of the corresponding control device has ended and no end signal is received from the another control device among the plurality of control devices, and
the transmission/reception unit is configured to receive a start signal which is a signal for instructing a start of the initial check, and
the initial check unit is configured to start the initial check in response to the transmission/reception unit receiving the start signal.

2. The control system according to claim 1, wherein
the transmission/reception unit is configured to transmit the start signal of the initial check to the another control device, and
the initial check unit is configured to start the initial check in response to the transmission/reception unit transmitting the start signal and receiving the start signal from the another control device.

3. The control system according to claim 1, wherein
in a case where the drive control unit starts the drive control of the rotary electric machine without acquiring the end signal from the another control device, the drive control unit increases an amount of current conduction to the corresponding winding set to be greater than that of a case where the drive control unit starts the drive control after acquiring the end signal from the another control device.

4. The control system according to claim 1, wherein
the drive control unit is configured to prohibit start of the drive control in response to the predetermined time elapsing without ending the initial check of the corresponding control device.

5. The control system according to claim 3, wherein
the drive control unit gradually decreases the amount of current conduction to the corresponding winding set in a case where the end signal from the another control device is acquired after the drive control unit starts the drive control of the rotary electric machine without acquiring the end signal from the another control device, and the drive control unit of the another control device gradually increases an amount of current conduction to a corresponding winding set in a case where that the initial check has ended after a time longer than the predetermined time elapses.

6. The control system according to claim 1, further comprising
a signal transmitter that transmits the start signal to each of the control devices.

7. The control system according to claim 1, wherein
the start signal is transmitted from another control system.

8. The control system according to claim 1, wherein
each of the plurality of control devices is supplied with power from mutually different power sources.

9. The control system according to claim 6, wherein
each of the plurality of control devices is supplied with power from mutually different power sources, and
the signal transmitter transmits the start signal in response to starting of power supply from the power sources to the control devices.

10. A control system comprising:
a plurality of control devices each configured to control current conduction to a corresponding winding set of a plurality of winding sets of a rotary electric machine, each winding set having windings of a plurality of phases, and to perform signal transmission and reception between the plurality of control devices, wherein
each of the plurality of control devices includes:
an initial check unit configured to perform a predetermined initial check before drive control of the rotary electric machine;
a transmission/reception unit configured to transmit or receive an end signal indicating that the initial check has ended; and
a drive control unit configured to perform the drive control of the rotary electric machine after the initial check is performed, wherein
the drive control unit is configured
to start the drive control of the rotary electric machine in a case where the initial check of the corresponding control device has ended and the end signal is received from another control device among the plurality of control devices, and
to start the drive control of the rotary electric machine after a lapse of a predetermined time from a predetermined time point in the initial check of the corresponding control device in a case where the initial check of the corresponding control device has ended and no end signal is received from the another control device among the plurality of control devices, and
the transmission/reception unit of at least one of the control devices is configured to receive a start signal which is a signal for instructing a start of the initial check,
the initial check unit of the at least one of the control devices is configured to start the initial check in response to reception of the start signal,
the transmission/reception unit of at least one of the control devices is configured to transmit the start signal of the initial check to another one of the control devices, and
the initial check unit of the at least one of the control devices is configured to start the initial check after a lapse of a predetermined waiting time from transmission of the start signal.

11. A control system comprising:
a plurality of control devices each configured to control current conduction to a corresponding winding set of a plurality of winding sets of a rotary electric machine, each winding set having windings of a plurality of phases, and to perform signal transmission and reception between the plurality of control devices, wherein
each of the plurality of control devices includes:
an initial check unit configured to perform a predetermined initial check before drive control of the rotary electric machine;
a transmission/reception unit configured to transmit or receive an end signal indicating that the initial check has ended; and
a drive control unit configured to perform the drive control of the rotary electric machine after the initial check is performed, wherein
the drive control unit is configured
to start the drive control of the rotary electric machine in a case where the initial check of the corresponding control device has ended and the end signal is received from another control device among the plurality of control devices, and
to start the drive control of the rotary electric machine after a lapse of a predetermined time from a predetermined time point in the initial check of the corresponding control device in a case where the initial check of the corresponding control device has ended and no end signal is received from the another control device among the plurality of control devices, and
the predetermined time point is a start point of the initial check of the corresponding control device.

* * * * *